United States Patent
Knebel et al.

(10) Patent No.: US 7,433,939 B2
(45) Date of Patent: Oct. 7, 2008

(54) FAST RECONFIGURATION OF NETWORK ELEMENTS

(75) Inventors: Uwe Knebel, Kronau (DE); Martin Huck, Möglingen (DE)

(73) Assignee: ALCATEL, Paris (FR)

(*) Notice: Subject to any disclaimer, the term of this patent is extended or adjusted under 35 U.S.C. 154(b) by 716 days.

(21) Appl. No.: 10/671,671

(22) Filed: Sep. 29, 2003

(65) Prior Publication Data

US 2004/0093399 A1    May 13, 2004

(30) Foreign Application Priority Data

Nov. 12, 2002  (EP) .................. 02025251
Mar. 11, 2003  (EP) .................. 03005283

(51) Int. Cl.
*G06F 15/16* (2006.01)

(52) U.S. Cl. ..................... 709/221; 370/226

(58) Field of Classification Search ............. 709/231, 709/221; 370/907, 225, 217–218, 226; 714/4; 379/221.01–221.04
See application file for complete search history.

(56) References Cited

U.S. PATENT DOCUMENTS 6,801,774 B1 * 10/2004 Haakana et al. ............. 455/446
6,951,373 B2 * 10/2005 Akita et al. ................. 305/103
2003/0189896 A1 * 10/2003 Dang et al. ................. 370/217

FOREIGN PATENT DOCUMENTS

| CA | 2272425 A1 * | 11/1999 |
| EP | 0 959 403 A2 | 11/1999 |
| EP | 0 966 169 A2 | 12/1999 |

OTHER PUBLICATIONS

Legge, George. "Change your screen resolution: it could be a whole new ballgame". Microsoft. Apr. 27, 2000.*
Colombo S et al: "Technologie der SDH-Netzelemente: Die Software-Platform" Elektrisches Nachrichtwesen, XX, XX, vol. 4, 1993, pp. 322-328, XP001038464.

* cited by examiner

*Primary Examiner*—Nathan Flynn
*Assistant Examiner*—Michael E Keefer
(74) *Attorney, Agent, or Firm*—Sughrue Mion, PLLC

(57) ABSTRACT

A method for re-configuring a network element of a transmission network to restore traffic after occurrence of a failure is proposed. Each configuration request is divided into two phases: At first a "fetch-ahead" phase and then a "consolidation". During fetch-ahead, only configuration steps essential for fast implementation of a new cross-connection are performed and security related configuration steps skipped thereby providing reduced security against process restarts. During consolidation, those previously skipped security related configuration steps are then executed and the changes made persistent.

12 Claims, 2 Drawing Sheets

FAST RECONFIGURATION OF NETWORK ELEMENTS

The invention is based on a priority application EP 03005283.1 which is hereby incorporated by reference.

FIELD OF THE INVENTION

The present invention relates to the field of telecommunications and more particularly to a method of reconfiguring network elements for path restoration in a transport network and a network element with fast restoration capabilities.

BACKGROUND OF THE INVENTION

Transport networks serve for the physical layer transport of high bitrate tributary signals. In particular, the signals transmitted over a transport network are encoded and multiplexed into a continuous bit stream structured into frames of the same length. Within this constant bitrate bit stream, the frames are repeated periodically with a frame repetition rate of typically 8 kHz and are structured according to a multiplexing hierarchy. An example of such a multiplexing hierarchy is SDH (Synchronous Digital Hierarchy, see ITU-T G.707 10/2000) where the frames are termed synchronous transport modules of size N (STM-N, where N=1, 4, 16, 64, or 256). The frames have a section overhead and contain at least one higher order multiplexing unit called virtual container VC-4, which can either directly carry a tributary signal or a number of lower order multiplexing units like VC-12 or VC-3, which then carry tributary signals.

Virtual containers are transmitted from source to sink through an SDH network and therefore represent a "logical" path through the network. The sequence of identical VCs having the same position in subsequent frames forms a traffic stream along that path. Each VC contains a path overhead (POH) and a payload section referred to as container (C). The US equivalent of SDH is known as SONET (Synchronous Optical Network). Another well known transport network with similar multiplexing units is the recently defined Optical Transport Network OTN; see ITU-T G.709, 02/2001.

A very basic aspect in all types of transport networks is availability and reliability of service. In other words, a transport network must be very robust against any kind of failure and the average outage time must be very low. Hence, a transport network needs to provide the means and facilities to ensure sufficient availability. Typically, network mechanisms which ensure this availability are distinguished in protection and restoration. The common principle of both is to redirect traffic of a failed physical link or logical path over a spare resource.

Protection is a mechanisms where an already established protection path or link is assigned to one selected high-priority path or link (known as 1+1 or 1:1 protection, depending on whether there is low priority extra traffic on the protection resource or not) or a group of n such selected paths or links (known as 1:n protection). In the case of a failure, traffic can be re-routed very fast over the previously established protection resource under the sole control of the affected network elements in typically less than 50 ms. However; this requires a protocol between the affected nodes to signal and synchronize switch-over. Protection is a high-quality service restricted to few selected premium connections, which are typically charged at a higher price. Moreover, protection requires a high amount of spare resources compared with the amount of protected resources, i.e., 100% of spare capacity in the case of 1+1 protection.

Restoration refers to a mechanism, where the network searches for restoration capacity and establishes a restoration path only after service path failure. Rather than calculating the restoration path after failure, pre-calculated restoration routes can be used instead but with the actual cross-connection to establish the path performed after failure. Restoration mechanisms are more stringent in the usage of spare capacity and however, providing a masking of the failure at a lower speed, typically in the range of a few seconds as completely new paths through the network must be established.

In order to establish a restoration path in the network, the management plane sends reconfiguration requests to the affected network elements, which have to connect the new path through. These requests are processed by and passed through a number of software layers until the actual hardware reconfiguration is finished. A major contribution to the overall restoration time is thus the time required for request processing and reconfiguration steps in the network elements.

Flexibility, efficiency and restoration make meshed networks getting more and more interesting as an alternative to ring network structures. Today, the decisive disadvantage of meshed networks is the long restoration time.

It is therefore an object of the present invention to provide a method which allows faster reconfiguration of network elements for path restoration in a transport network and a network element with fast restoration capabilities.

SUMMARY OF THE INVENTION

These and other objects that appear below are achieved because, each reconfiguration request is divided into two phases: At first a "fetch-ahead" phase and then a "consolidation". During fetch-ahead, only configuration steps essential for fast implementation of a new cross-connection are performed and security related configuration steps skipped, thereby providing reduced security against process restarts. After fetch-ahead, changes are temporarily valid in all software layers. During consolidation, those previously skipped security related configuration steps are then executed and the changes made persistent.

This accelerates reconfiguration especially in restoration scenarios. If two requests follow each other directly, the second request is delayed until the consolidation of the first one has been finished.

BRIEF DESCRIPTION OF THE DRAWINGS

A preferred embodiment of the present invention will now be described with reference to the accompanying drawings in which.

DETAILED DESCRIPTION OF THE INVENTION

In this specification, we use the term transmission signal for a multiplex signal subdivided into frames of the same length. The frames are structured according to a multiplex hierarchy into multiplex units such as virtual containers VC in SDH. A certain multiplex unit represents a path through the network and repeats every frame. The sequence of identical multiplex units that are transmitted along the same path form a traffic stream which transports a tributary signal. Several traffic streams are thus multiplexed according to the multiplex hierarchy to form the transmission signal.

Figure 1:
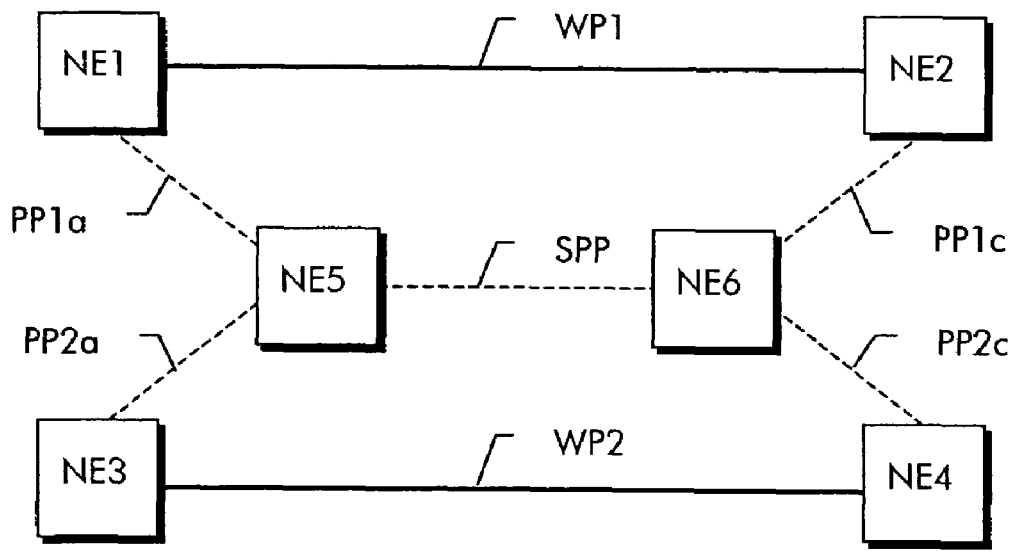
FIG. 1 shows an example network topology.

An example network topology is shown in FIG. 1. A first working path WP1 exists between network elements NE1 and NE2 and a second working path WP2 exists between network elements NE3 and NE4. Broken lines PP1a, PP1c, PP2a, PP2c, and SPP indicate reserved restoration capacity allowing network restoration in the case of a failure of either of the working paths. If for example path WP1 fails, a restoration path (also termed backup path) is created via network elements NE5 and NE6 using restoration capacity PP1a, SPP, and PP1c. Conversely, if path WP2 fails, a restoration path is created using restoration capacity PP2a, SPP, and PP2c. It is important to understand, that these restoration paths, even if they may be pre-calculated, are only established after occurrence of a failure. In other words, the network elements NE5 and NE6 switch a corresponding internal crossconnection to establish the restoration path only after a failure has occurred. This allows to share a single entity of restoration capacity SPP between NE5 and NE6 for both working paths.

It should be noted that transmission signals are multiplex signals and carry more than one tributary signals. In the example chosen, the transmission signals are structured according to the SDH. This means, a transmission signal is a continuous bit stream subdivided into frames with a length of 125 μs, each. The frames are called synchronous transport modules STM-N (N=1, 4, 16, 64 or 256). Each STM-4 frame for example contains four higher order multiplex units VC-4, which in turn can contain either three lower order multiplex units VC-3, 21 lower order multiplex units VC-2 or 63 lower order multiplex units VC-12, each, or any suitable combinations thereof. Each multiplex unit represents a path through the network. The multiplex units carry the actual tributary signals and are repeated within each successive frame in exactly the same order. This is called the structure of the multiplex signal which is normally only changed by the control plane to establish new paths or change or delete existing paths. Idle multiplex positions within the payload section of a frame (i.e., those being available as restoration capacity) are filled with dummy multiplex units carrying the so-called supervisory unequipped signal.

In order to be able to properly process the received transmission signal and in order to check consistency of the bit stream received, each receive interface has to know exactly the structure of the multiplex signal, i.e., which and how many multiplex units are multiplexed into each frame. Though, when new paths are created and the structure of the multiplex signal is thus changed, the receive end interface has to be reconfigured to accept the new multiplex structure. If the received multiplex structure does not match with the configured multiplex structure, the receive interface raises a mismatch alarm, which normally means that there is something wrong in the network, e.g., because a human operator has accidentally mixed up some cables.

In the case of a failure, each network element along the restoration path has to be reconfigured. Such reconfigurations include a new crossconnection from input to output to establish the restoration path through the respective network element and reconfiguration of the interfaces to accept the structure of the transmission signal, which now carry a new multiplex unit relating to the restoration path.

Figure 2:
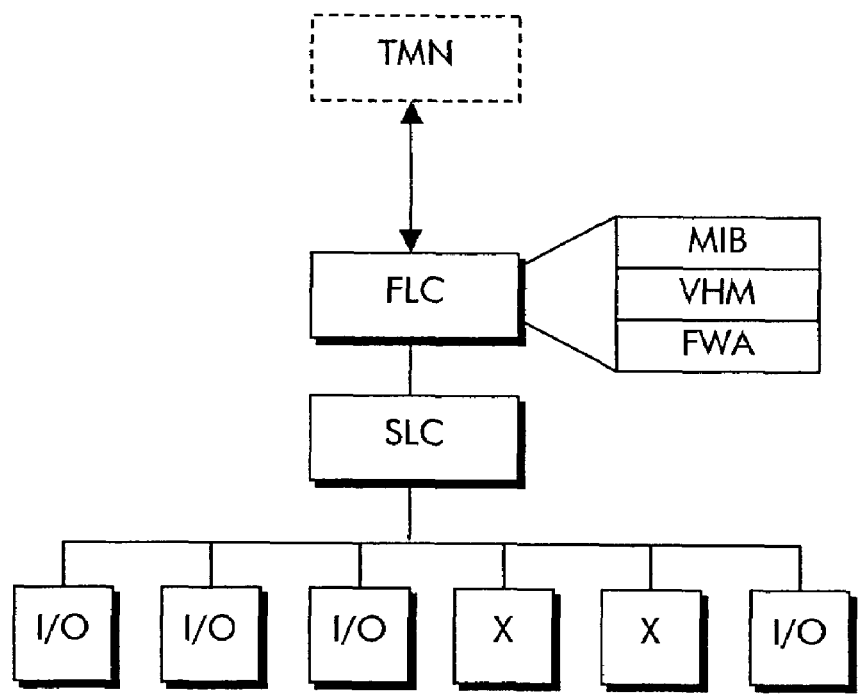
FIG. 2 shows the control and management of a network element.

The hardware design and control of a network element is shown schematically in FIG. 2. The network element itself consists of a number of hardware modules, such as input/output boards I/O and crossconnect matrix boards X shown in the embodiment by way of example. Interconnections and signal flow of transmission signals are not shown in the figure.

The individual boards are controlled and configured by a low level hardware controller, which is called second level controller SLC. The second level controller can be distributed among the boards, can consist of some few shelf controllers, or can also be a single controller if the network element is installed in only one shelf. It contains the hardware oriented control software which is termed firmware. In the embodiment described below, the SLC is composed of a number of shelf controllers each controlling a shelf with I/O boards and a clock and control unit (CCU) for the matrix boards The second level controller is controlled by a higher level controller called the first level controller FLC. A layered software architecture is chosen for the FLC. It contains for the purpose of network management an abstraction of the network element and its resources in the form of a management information base (MIB). The MIB contains managed objects (MOs) respectively representing the physical and logical resources of the entire network element and their configuration. A virtual hardware manager (VHM) and a firmware adaptor (FWA) interface the MIB in the first level controller towards the firmware in the second level controller.

The MIB is an abstraction of the resources of the network element according to an info model and has a logical view of the network element. The VHM is a software layer that has an overview over the hardware of the network element and hides hardware-specific characteristics to the MIB. The FWA is an intermediate software layer that maps the message set of the VMH to the message set of the firmware running on the SLC. The FWA can thereby support more than one message sets corresponding to different pieces of firmware or different firmware implementations. The MIB and VHM software layers each have their own persistent storage (the "Persistency") where they store an image of their actual configuration so that after a system crash, the entire configuration of the system can be restored. Equally, the SLC has its own database where it stores its actual configuration. An overview over the layered system architecture is also given in EP 0 959 403, which is incorporated by reference herein.

The first level controller FLC is controlled by a network management or control plane TMN, which may be a central network management system for the entire network. The interface between the central network management system and the network elements is known as the Q-interface for which a standardized protocol exists. Alternatively, the control plane may be a distributed network management system where each network element is controlled by an individual element controller and where these element controllers communicate with each other using the recently defined GMPLS protocol to find a route through the network and establish network paths. Communication within the control plane and towards the network elements uses a dedicated packet switched control network apart from the transport network. However, some interconnections in this dedicated control network may use the so-called data communication channels in the section overhead of transmission signals in the transport network.

The control plane TMN is responsible to properly configure the entire network. If for example a new connection is to be established in the network, the control plane instructs the first level controllers of the affected network elements to switch the new connection. The first level controllers reconfigure their abstract view of the corresponding network elements accordingly and update their persistent configuration data. Then the request is forwarded to the second level controller, which determines the actual hardware modules involved and reconfigures these to establish the connection as requested.

In reverse direction, the second level controller monitors the hardware modules for any alarm and failure conditions and reports these to the first level controller. The first level controller maps alarm and failure reports on the abstraction and reports any irregularities to the control plane.

The network element has a redundant switching matrix with matrix copies A and B. Moreover, the network element has redundant controllers, but which are not shown for sake of simplicity. One of the two redundant controllers is active while the other is in standby mode and tracks all configuration steps of the active one.

In the case of a failure, the control plane TMN needs to localize a failure by correlating received alarm reports and requests the affected network elements to switch new cross-connections to establish a dynamically calculated or pre-calculated restoration path.

A detailed analysis has shown that the main time slice is consumed in a network element for the implementation of the new paths. A less significant but nevertheless not negligible delay is caused by alarm detection and propagation. Further delays are intentionally implemented in the MIB and the management plane to cumulate alarms before reporting and reacting.

It is important to bear in mind that the described software architecture has been chosen with an emphasis on a secure provisioning mechanism and naturally this security is paid with additional processing time.

The major objective for path implementation is performance. Not less important is that the system reliability is not affected. To meet these opposed requirements it is basic idea of the present invention to split the processing in the network element into two phases:

The first phase ("fetch-ahead") is designed to minimize processing time and to implement the new paths as fast as possible. This step provides reduced security against process restarts and ignores all activities which are not absolutely necessary for path restoration.

The following second phase ("consolidation") is executed in the traditional way, i.e., slower but secure. In nearly all cases the fetch-ahead will be successfully executed and only if an exceptional event happens, e.g. if a process crashes, it may fail. Such an exception, however, will only affect the path restoration time since the following slower consolidation step will create the requested new paths, anyway.

Figure 3:
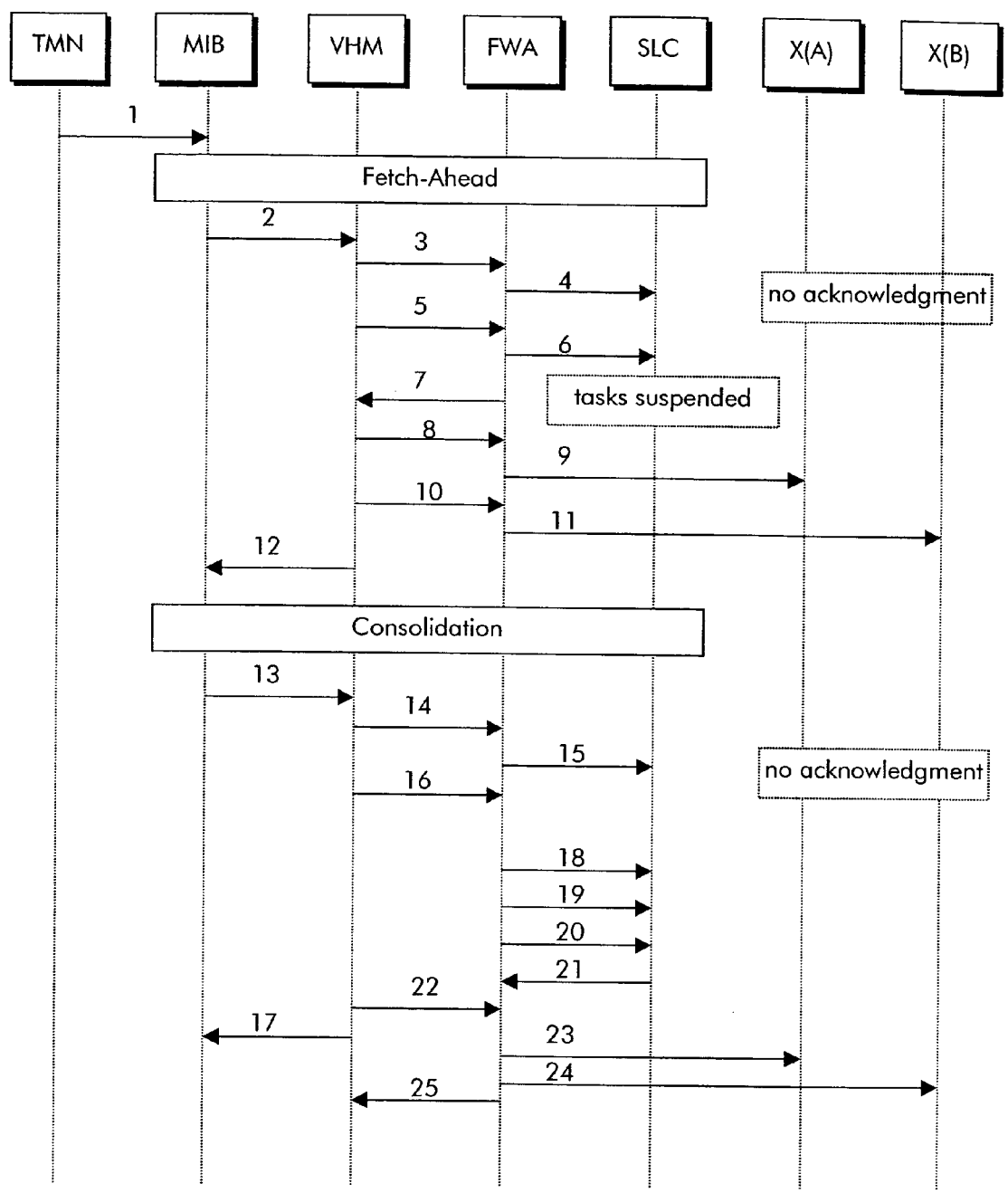
FIG. 3 shows in a chart the message flow and processing of a configuration request in a network element.

An overview scenario is given in FIG. 3. The management plane TMN sends in step 1 a configuration request to the network element. This starts the preliminary fetch-ahead phase. The MIB expands the compact message format of the restoration request, scans the request and filters all connection relevant information. The filtered information is directly translated into the VHM message set and sent in step 2 to the VHM.

The VHM issues in step 3 a "start restoration" signal to the FWA, which broadcasts in step 4 the message "startHoldOff" to all I/O shelves and matrix boards X(A), X(B) so that no connection failed alarm nor consequent actions nor a matrix EPS (equipment protection switching) is executed while the connections are instable. This message is not acknowledged. Then VHM disables the persistency management, e.g. all the following modifications are not written to disk or copied to the redundant controller but they remain only in memory. The information received by the VHM is already filtered for connection relevant information by the MIB. As a consequence, VHM activity is automatically focused on creating the new paths. Further improvements, e.g. special processing for the fetch-ahead or the collection of concatenation information per shelf in steps 5, 6, and 7 is implemented to reduce processing and communication times. All tasks at the SLC, however, remain suspended. When all configuration is calculated, VHM sends in step 8 the configuration messages to the FWA. All these messages contain a 'fetch-ahead' indication.

The matrix configuration is sent as a normal connection request which contains the 'fetch-ahead' indication. The configuration messages are duplicated by VHM (8 and 10) and sent via the FWA in steps 9 and 11 to both matrix copies X(A) and X(B).

For the SLC configuration, FWA receives only a single message 7 per I/O shelf which contains the concatenation and matrix connection information. This information is sent as a single container message to the active SLC and implicitly includes 'StartUpdProv' and 'UpdProv'. A container message is an aggregation of several individual messages or requests into a single message. The message 'StartUpdProv' indicates to the SLC the beginning of a provisioning sequence. During the provisioning sequence, the SLC receives and accepts a number of configuration messages. 'UpdProv' indicates to the SLC the end of the provisioning sequence. Only after receipt of this 'UpdProv' message, the SLC starts determining a new updated hardware configuration (i.e., the ASIC map) from the various configuration messages and writes these into the hardware.

SLC analyses the database changes and limits the calculation of register maps to connection relevant information. This will partly be achieved because FWA has sent in steps 9 and 11 a reduced number of blocks to the SLC. Nevertheless SLC executes an optimized hardware provisioning because it knows that this fetch-ahead pass is limited to the creation of new connections.

As a result the paths are very early restored. But the fetch-ahead leads to an inconsistent configuration which will not survive any process restart or EPS. The configuration is inconsistent with respect to PM (performance monitoring), path monitoring, and internal supervision configuration. Due to the inconsistency, the IO shelf SLC will not resume the suspended tasks—this is only done after the consolidation request is received.

When VHM and FWA have finished their communication, VHM sends the fetch-ahead response in step 12 to the MIB and then MIB starts processing the original restoration request in the normal way (consolidation): it creates and updates all MOs, connections, etc. and makes them persistent. At the end the consolidation request 13 is sent to VHM.

Even for the consolidation the 'startHoldOff' message 15 has to be broadcasted to all I/O shelves. This is necessary for certain restart scenarios of the SLC.

VHM manages this request in a conventional way, as well: all connections, monitors, etc. are configured and then persistency management is enabled again. When all data is persistent, MIB gets the acknowledgment 17 for the request. VHM shall reuse results from the fetch-ahead step, mainly the matrix routing must be the same in order to avoid hits on already restored traffic.

During consolidation 16-22, FWA maps all configuration blocks and sends them to the SLC. Some information from the fetch-ahead will be simply re-written and there is no need to optimize the mapping. The SLC processes the consolidation request and afterwards all tasks are resumed.

In this steps 16-22, the new configuration is transferred via the FWA to the SLCs (i.e., the shelf controller for the I/O boards and the CCU for the matrix boards). This contains all messages sent during fetch-ahead as well as additional messages for monitors and the like. The FWA collects all messages from VHM to SLC. After the last message, which is marked by a special attribute, is sent by the VHM, the FWA generates new messages therefrom and sends these to the SLC. These messages generated by the FWA are a provisioning sequence including the messages 'StartUpdProv' and 'UpdProv'. Each message is acknowledged by the SLC. After the SLC has acknowledged the 'UpdProv' message, the FWA sends an acknowledgement 25 to the VHM.

Messages 16 and 22 include a set of configuration messages, which are send one after the other and are each acknowledged at some time by the FWA. Acknowledgment 17 is send directly after message 22. Messages 18, 19 and 20 will be acknowledged immediately. Acknowledgment 25 come only after the final response from the SLC. In steps 23 and 24, the new hardware configuration is sent to the hardware, i.e., the matrix boards of matrix copy A X(A) and redundant matrix copy B X(B).

The controllers of the network element must be adapted for the fetch-ahead processing, i.e. the instantaneous mapping of the incoming request to a VHM request without prior storing to persistent database. In addition it must be ensured, that after every fetch-ahead processing the MIB sends at once the resulting message to VHM and that an eventually incoming further request (restoration or non-restoration) is not handled until the consolidation phase is finished.

The restoration request must be filtered for connection relevant data to be mapped and sent directly to VHM. These data are:
- connections (both for creating/activating and for deleting/deactivating requests). Note that commands e.g. force switch in case of an SNCP are ignored in VHM during fetch-ahead
- concatenation levels In fact, MIB sends the connection requests towards VHM and VHM is responsible to provide the correct concatenation level of the transmission points to be connected, i.e. MIB does not send an explicit concatenation request.

Before starting the consolidation, MIB should wait a predefined period of time in order to give VHM, FWA and IntComm processes access to the system resources, especially the CPU computing time. IntComm is a process responsible for communication between FWA and SLCs, but which is not particularly relevant here.

Therefore an own socket is used between MIB and VHM for the fetch-ahead communication. This socket is prioritized in the VHM. When MIB has sent the fetch-ahead request to VHM, it waits until VHM sends the fetch-ahead response on this socket. This response indicates that all lower level processes have completed their fetch-ahead processing. A socket is an application program interface (API) for communication between two independent processes in a multi-tasking computer environment.

To handle errors, due to which VHM never sends the response, MIB needs a time-out. The fetch-ahead socket is instantiated with a keep-alive of 30 seconds (a long time-out but which is only needed in a very improbable error case). This ensures that at least every 30 seconds the progressInstance returns. Because it returns, too, when an alive message is received on another socket, the time the request was sent must be kept in MIB (not persistent). The waiting for VHM is stopped if more than 10 seconds have been passed. Even in this error case, the consolidation is started (including the normal error handling, if needed).

In case when a VHM process restarts, the fetch-ahead socket is closed. This event is then used as a trigger for the MIB to immediately start the consolidation.

Special care has to be taken for cases when the consolidation phase aborts for any reason, e.g. when MIB process restarts or when the restoration request is rejected by the MIB during the checks in the consolidation phase. Because no storing to persistent database is done in the fetch-ahead phase (even not the request itself), whenever a MIB process restarts, the restoration request is totally lost in the MIB. The management plane detects this MIB restart and starts immediately a rerouting over other NEs. But because the fetch-ahead request is already sent to VHM and therefore also valid in the hardware, a mechanism is needed to trigger a fall-back to the former state: As soon as VHM detects that the fetch-ahead connection to MIB is broken, it has to reestablish its state before the fetch-ahead request, for example by a simple process restart or by an explicit transaction rollback. Also the SLC, i.e., the shelf controllers and the CCU (clock and control unit) must fall back to the configuration before the fetch-ahead.

If MIB rejects a restoration request, the VHM (and again SLC and CCU) must also reestablish their state before fetch-ahead. MIB can trigger this by a simple close and restart of the fetch-ahead connection to VHM. This is interpreted in VHM like a MIB process restart and handled accordingly.

Note that as long as the management plane does not distinguish between restoration and normal connection set-up, every request is handled in two phases, i.e. in total more time is needed between request from management plane and response to it (i.e., only after consolidation phase is finished).

Processing in the VHM and Related Modifications a) Handling and Forwarding of Fetch-ahead Indication A new message attribute has to be defined in the VHM message set, indicating the fetch-ahead (to indicate the consolidation messages, the Restoration Container message set is used). This fetch-ahead request message is sent from the MIB via a special socket connection with a higher priority than the normal connections to ensure the precedence of the fetch-ahead.

When receiving the fetch-ahead request, VHM has to change its internal state to indicate that a special handling (see below) is needed. Beside of this, VHM sends at once the RestorationStart message to FWA, adapts the concatenation levels of the involved TPs (transmission points) and performs the usual connection handling.

At the end of the fetch-ahead processing, VHM sends the new connectivity messages together with the concatenation information in a single message per shelf with a fetch-ahead indication to FWA.

b) Inhibit Persistency During Fetch-ahead

To avoid the time consuming writing to the persistent database ("Persistency") during fetch-ahead, VHM disables all persistency functionality. This can be done centralized in the VHM platform: The objects changed during fetch-ahead register themselves in a conventional manner at an object communication database (ObjCommDB) and a persistency record handler (PersRecHdlr). But at the end of the request processing they are not written to Persistency but are still kept registered. This ensures, that they will be written after the following consolidation processing, though they may not (again) change their attributes during consolidation (and therefore usually will not register themselves).

c) Limited Configuration in Fetch-ahead

It has to be ensured that only the messages concerning connections and concatenation are sent to FWA, e.g. no PM configuration, no TP configuration, or the like.

Normally, every changed object registers itself at VHM Flow Control and at the end of the request processing these registered objects are called back to enable them to send their complete configuration to FWA (including the changed attributes). During fetch-ahead all registered objects must be kept registered. In the following consolidation they are called back and they send their complete configuration to FWA. Thereby, the status of the FWA will become up to date (including further attributes which may be changed during consolidation).

d) Implicit Concatenation Requests in Fetch-ahead

If for a restoration request the concatenation level of a TP has to be changed, VHM has to detect this autonomously in the connection request and must change it. During fetch-ahead, MIB performs a simple mapping without checking the actual states of the involved TPs. Therefore, no explicit concatenation request is sent to VHM.

e) Collect and Send Concatenation Information Separately

If the concatenation level changes, VHM has to create and delete the corresponding objects. This must be done even during fetch-ahead to allow the creation of new crossconnections via these concatenated TPs (e.g. to be used in the matrix routing algorithm). Usually these new objects send their (default) configuration to FWA, including a lot of information not needed during fetch-ahead.

To avoid these configuration messages, which must be transmitted to FWA, and also to simplify and accelerate the job of FWA, the concatenation information must be stored separately per I/O shelf. This information then can be sent in a new (to be defined) sub-message to FWA, together with the connection information, i.e., only one message per shelf is sent (which saves communication time) and is addressed to the active SLC.

It has to be noted that the concatenation information is only needed in the I/O shelves. For the matrix shelves the connection information is sufficient.

f) Special Socket for Fetch-ahead Requests from MIB

To prioritize the fetch-ahead request over other actual queued requests (from MIB as well as from FWA, especially PM reports) and also to enable MIB suspending itself, a new socket has is defined. This new socket is exclusively used for fetch-ahead communication between MIB and VHM: MIB sends the restoration request, VHM sends a response after all messages to FWA are sent and an additional, configurable time-out is expired. Its priority is set to high, i.e., has the same priority as the configuration socket to FWA, for example.

g) Delay Fetch-ahead Response to MIB

To give the MIB a trigger when it can start the consolidation, the fetch-ahead acknowledgement to the MIB request is delayed until the complete fetch-ahead configuration (for all involved I/O and matrix shelves) is sent to FWA. Because FWA then needs some time to map these requests and to send them further on towards SLC and CCU (using an Intcomm process), VHM calls a sleep process (msecSleep.h) after having sent the last request to FWA. The value of this sleep must be configurable. Its range should be from 0 to 500 msec with a default of 50 msec. When this timer expires, VHM sends the response to MIB which starts the consolidation instantaneously.

A potential alternative to the delay timer is the following: For every fetch-ahead request from VHM, FWA sends a notification event back to VHM after it has mapped and sent this request further on to the SLC and CCU (in addition to the normal response, which is sent after FWA has received the response from SLC/CCU). VHM collects all these notification events and as soon as for every involved shelf such a notification has been received, the fetch-ahead response can be sent to MIB. This alternative, however, will delay to some extend the execution of the following fetch-ahead requests for further shelves.

h) Make all Changes Persistent in Consolidation Pass

Because no storing to persistency is done during fetch-ahead, all changed objects must be written in the consolidation pass together with the additional objects changed during consolidation.

i) Repeat Fetch-ahead Configuration in Consolidation Pass

All the configuration and connection requests during fetch-ahead are sent to the active SLC and the two active CCUs (of copy A and copy B), only. Therefore, they must be repeated during consolidation. For new or changed objects like TPs (transmission points), this can be easily achieved by keeping them registered at the VHM flow control. Then they are called back during consolidation and send their now actual configuration (including further changes made during consolidation) towards FWA.

For connections it is a little bit more complex: The connection requests which are repeated from MIB during consolidation are recognized as already valid. Therefore nothing has to be done in VHM and nothing would be sent to FWA. This ensures that no new routes through the matrix are calculated for the connection requests repeated in the consolidation.

To ensure that the connection requests are repeated, a total connection reload is triggered, i.e. the complete list of their active connections are sent to all matrix boards.

k) Delay Rearrangement after Consolidation

The matrix is a three stage Clos matrix. In certain situations, it may happen that for a new connection to be established, no free center stage module can be found. The connection is thus "blocked" in the matrix and this situation is resolved by re-arranging some other already existing connections to free a center stage module for the new connection.

If during a fetch-ahead the matrix firmware recognizes a need for a rearrangement, this part of the connection request is ignored. But all the other possible connection requests are handled as usual in the fetch-ahead. During the following consolidation phase, the same happens: the possible connections are recognized as already present, those leading to rearrangement are negatively responded to MIB and the consolidation phase is finished.

Having received a negative response with rearrangement indication, MIB resends these connection requests but now outside of restoration. Now they are handled in VHM as usual, i.e. the rearrangement is performed.

l) Alarm Events Between Fetch-ahead and Consolidation

Although the alarm reporting is switched-off in the I/O shelves by the restoration start message, there may be an event already waiting in the queue.

This alarm cannot be made persistent until end of the consolidation phase. Therefore it must not be acknowledged until then. But anyway it can be processed and also forwarded to MIB (which does not handle it until the end of consolidation). Alternatively VHM can just ignore the incoming alarms. Flow control mechanisms in FWA and SLC ensure that this alarm is repeated later.

m) EPS Switch of SLC Between Fetch-ahead and Consolidation

If for any reason an SLC or CCU performs an EPS switch between fetch-ahead and consolidation, it will lose the configuration sent in the fetch-ahead request, e.g. new connections are removed as soon as the former standby SLC or CCU is up. Because of the small probability of an EPS switch (note that the hold-off time is active), it can be accepted that here the connection request is delayed until consolidation.

If VHM receives the switch indication from an SLC or CCU, it must keep this in mind and at the end of the consolidation this switch indication triggers a complete configuration reload of this shelf including the changes for the restoration request, handled in the consolidation.

n) Restart of MIB Between Fetch-ahead and Consolidation

A process restart of the MIB can be detected by VHM because of the broken fetch-ahead socket communication. Getting this trigger, VHM has to reestablish the state as it was before the fetch-ahead because MIB has no persistent knowledge of the restoration request until the end of the consolidation phase.

To reestablish the former state, VHM can either perform a process restart, too, or can perform a transaction rollback. In both cases it looses the fetch-ahead state indication.

Some time later, at the SLC or CCU the consolidation time-out exceeds. Then the SLC or CCU performs a reload of their former database contents. Note that CCU does not write the changes for fetch-ahead in its database while SLC has two separate databases (one for the last fetch-ahead changes, one for the state before). After this reload, the pre-fetch-ahead state is reestablished also in the hardware.

o) Restart of VHM Between Fetch-ahead and Consolidation

A restart of VHM does not matter (of course MIB must recognize this to stop the waiting for the fetch-ahead response) because MIB will send the complete restoration request during consolidation. However, VHM must not reject a consolidation for which it does not know about a previous fetch-ahead. Moreover, it is important that VHM sends again the "RestorationStart" message to trigger the hold-off in the shelves. Note that the SLC may have already performed a warm start because of a consolidation time-out.

Processing in the FWA and Related Modifications

FWA has to broadcast the "startHoldOff" message to all SLCs when it receives the "RestorationStart" message but will not acknowledge the "RestorationStart" message.

As a second improvement FWA shall inhibit any PM history handling for N seconds as soon as it receives the "RestorationStart" message at the beginning of the restoration. The PM history handling is continued when the timer expires. This is also necessary because any SLC that has received fetch-ahead request has suspended its tasks and cannot deliver PM history data.

In case FWA restarts, VHM repeats the configuration after flow control time-out. As a consequence the fetch-ahead may fail and paths are not restored in a fast manner.

Processing in the SLC and Related Modifications

The fetch-ahead configuration bypasses the normal process architecture (database, hardware updater) to improve the performance. It is not necessary to store fetch-ahead information in the database—this will be done with the consolidation request.

Only in case the fetch-ahead could not be closed with the corresponding consolidation pass, i.e., in the exceptional case when MIB or VHM crashed, the timer expires and firmware (FW) shall reload the unchanged configuration of the database.

In restart scenarios it may happen that a CCU receives a consolidation request without a preceding fetch-ahead. This request must be accepted like a normal configuration request.

FW has to distinguish between consolidation configuration and normal configuration requests. If the FW receives a normal request while expecting a consolidation request it shall reload the status stored in the database to the hardware before processing the request.

Assume that the FW has received the fetch-ahead configuration and then VHM restarts and processes another configuration (i.e., not a consolidation). If the FW would accept this request, a mixture of the unconfirmed/invalid fetch-ahead configuration and the normal configuration would be applied to the hardware and the configuration know by VHM and FW were inconsistent. The FW shall also accept further fetch-ahead configurations before the consolidation arrives. The configuration applied to the hardware is the merged fetch-ahead data. Each fetch-ahead restarts the 'consolidation supervision timer' which has a preferable value of 25 sec.

During fetch-ahead FWA will only send connection related configuration with a fetch-ahead container to the SLC, therefore provisioning activity is already reduced due to the limited number of changed configuration blocks in the SLC database.

The fetch-ahead container implicitly contains startProv and UpdateProv and is not stored in the SLC database. SLC will implement the new connections and disables SUG (supervisory unequipped) generators. Afterwards all tasks remain suspended until the consolidation request arrives. This abnormal condition for the SLC is supervised with a 'consolidation supervision timer'.

If the timer expires before the consolidation configuration arrives, the SLC will execute a warm start using the unchanged database content (rollback from fetch-ahead). The fetch-ahead configuration which was configured in the hardware is therefore lost. Afterwards the SLC is in normal operational state.

Between fetch-ahead and consolidation the SLC shall accept further fetch-ahead configurations. The 'consolidation supervision timer' shall be restarted after each fetch-ahead request.

If the SLC receives a normal configuration request it will immediately execute a warm start using the old database content. In this case the SLC will not generate any answer for the configuration request.

In restart scenarios it may happen that the SLC receives a consolidation request without a precedent fetch-ahead. This request must thus be managed like a normal configuration request.

Although having described several preferred embodiments of the invention, those skilled in the art would appreciate that various changes, alterations, and substitutions can be made without departing from the spirit and concepts of the present invention.

A further improvement could be achieved for example that in the case of a second configuration request, the MIB aborts an ongoing consolidation of the first request, performs the fetch-ahead of the second request and then performs a combined consolidation request for both configuration requests.

What is claimed is:

1. A method of re-configuring a network element of a transmission network to restore traffic after a failure, said method comprising:

generating a configuration request to implement a new cross-connection through said network element, said configuration request indicating an internal cross-connection of said transmission network to be switched by said network element, performing said configuration request in a first fetch-ahead phase comprising only configuration steps essential for fast implementation of said new cross-connection and skipping security related configuration steps thereby providing reduced security against process restarts; and performing said configuration request in a second consolidation phase comprising said previously skipped security related configuration steps; and wherein said internal cross-connection of said transmission network immediately after said first fetch-ahead phase is the same as said internal cross-connection of said transmission network immediately after said second consolidation phase.

2. The method according to claim 1, wherein said consolidation phase comprises a consistency check of said configuration request and storing of configuration changes in a persistent local database.

3. The method according to claim 1, wherein if performance of said configuration request in the fetch-ahead phase leads to an inconsistency between an actual hardware configuration and a locally stored configuration data of said network element, said inconsistency is resolved during said consolidation phase.

4. The method according to claim 1, wherein a timer is started during said fetch-ahead phase and if said timer lapses before said consolidation phase completes, configuration steps performed during said fetch-ahead phase are undone by re-loading a stored configuration data.

5. The method according to claim 1, wherein a route of said new cross-connection though said network element established during said first phase, is not changed during said second phase.

6. The method according to claim 1, wherein said configuration request to implement a new cross-connection is completely fulfilled in said first fetch-ahead phase.

7. A network element of a transport network, comprising:
a plurality of input ports and a plurality of output ports,
a cross-connection matrix for randomly establishing connections from one of the plurality of input ports to one of the plurality of output ports, and
at least one controller for configuring said network element and establishing cross-connections through said cross-connection matrix;
wherein said at least one controller is adapted to perform a received configuration request in a fetch-ahead phase first and to perform said received configuration request in a consolidation phase thereafter, said configuration request indicating an internal cross-connection of said transport network to be switched by said network element;

wherein said fetch-ahead phase comprises only configuration steps essential for fast implementation of said cross-connection and skips security related configuration steps thereby providing reduced security against process restarts; and wherein said consolidation request comprises said previously skipped security related configuration steps; and wherein said established cross-connections of said cross-connection matrix immediately after said fetch-ahead phase is the same as said established cross-connections of said cross-connection matrix immediately after said consolidation phase.

8. The network element according to claim 7, wherein said controller comprises:
a layered control software with at least two software layers,
a first software layer comprising an abstraction of physical resources and logical resources of said network element for the purpose of network management, and
a second software layer comprises a representation of actual hardware modules of the network element and the network element configuration;
wherein said first software layer and said second software layer comprise an individual persistent storage storing an image of configuration data of a corresponding software layer of said software layers; said controller being adapted to successively process said configuration request in said first software layer and said second software layer and forward said configuration request to a next lower layer of said software layers,
wherein storing of configuration data to the persistent storage is performed in each of said layers during said consolidation phase, only.

9. The network element according to claim 7, wherein said consolidation phase comprises a consistency check of said configuration request and storing of the configuration changes in a persistent local database.

10. The network element according to claim 7, wherein execution of said configuration request in the fetch-ahead phase leads to an inconsistency between an actual hardware configuration and a locally stored configuration data of said network element and wherein during said consolidation phase, said inconsistency is resolved.

11. The network element according to claim 7, further comprising a timer which is started during said fetch-ahead phase and if said timer lapses before said consolidation phase completes, configuration steps performed during said fetch-ahead phase are undone by re-loading stored configuration data.

12. The network element according to claim 7, wherein said configuration request to implement a new cross-connection is completely fulfilled in said fetch-ahead phase.

* * * * *